Oct. 3, 1944.  W. A. SANDBERG  2,359,683

HORIZONTAL TANK AND SUPPORT THEREFOR

Filed Jan. 12, 1942  4 Sheets-Sheet 1

WILLIAM A. SANDBERG
INVENTOR

ATTORNEY

Oct. 3, 1944.　　W. A. SANDBERG　　2,359,683
HORIZONTAL TANK AND SUPPORT THEREFOR
Filed Jan. 12, 1942　　4 Sheets-Sheet 2
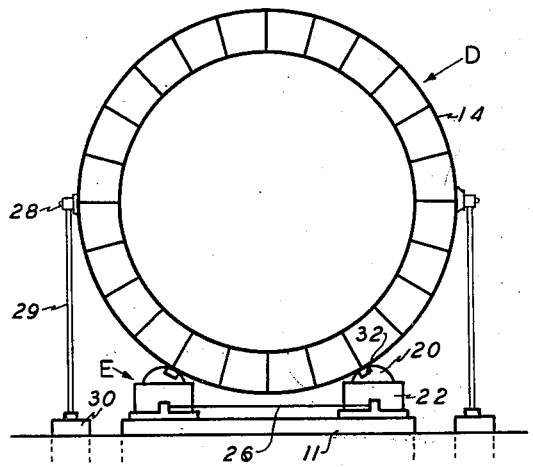
FIG. 6
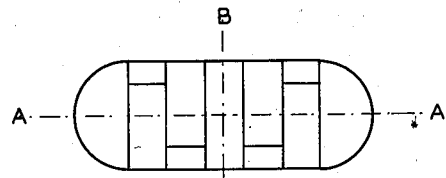
FIG. 9
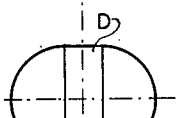
FIG. 8
FIG. 7'
FIG. 7
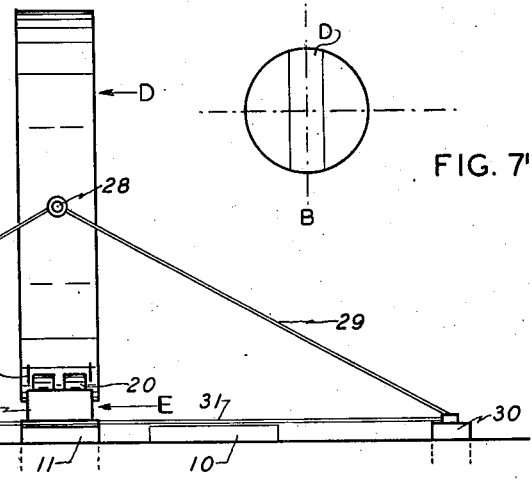
FIG. 10
FIG. 15
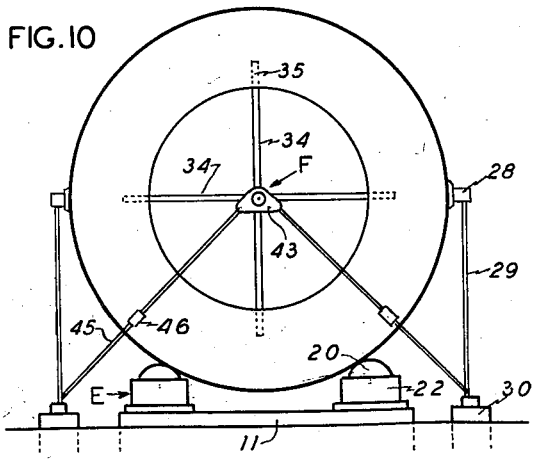
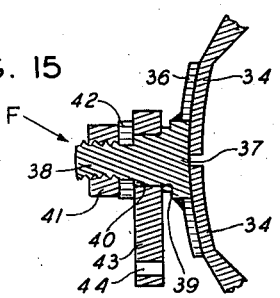
WILLIAM A. SANDBERG
INVENTOR
ATTORNEY Oct. 3, 1944. W. A. SANDBERG 2,359,683
HORIZONTAL TANK AND SUPPORT THEREFOR
Filed Jan. 12, 1942 4 Sheets-Sheet 3

WILLIAM A. SANDBERG
INVENTOR

ATTORNEY

WILLIAM A. SANDBERG
INVENTOR

Paul W. Trueman
ATTORNEY

Patented Oct. 3, 1944

2,359,683

UNITED STATES PATENT OFFICE 2,359,683

HORIZONTAL TANK AND SUPPORT THEREFOR

William A. Sandberg, Los Angeles, Calif.

Application January 12, 1942, Serial No. 426,393

5 Claims. (Cl. 220—1)

An object of the invention is to provide an improved form of the well known balloon tank, commonly used for the storage of compressed gases and highly volatile liquids.

An object of the invention is to provide a balloon tank, either substantially spherical or substantially cylindrical in form, having a horizontal major axis and supported solely in a single vertical plane.

An object of the invention is to provide a balloon tank having a heavily reinforced ring-shaped girth element engaging the supporting members and a relatively light shell attached to and supported by said ring-shaped element.

An object of the invention is to provide a simplified method of permanently supporting a balloon tank.

An object of the invention is to provide a method of constructing a balloon tank which permits the tank to be rotated on its horizontal axis for convenience in welding and which requires the minimum use of blocking, bracing or staying during construction.

The construction method described herein is a modification of and in some respects an improvement over the method described in my copending application entitled "Method of constructing horizontal cylindrical tanks," filed March 19, 1940, under Serial No. 324,838, now matured into Patent No. 2,287,198.

The finished structure and the method by which it is produced are illustrated in exemplary form in the attached drawings and the following description thereof, in which:

Fig. 6 is an end elevation of the girder ring in place on the roller boxes, as it appears in the first stage of construction;

Fig. 7 is a side elevation of the same, showing the method of bracing the ring to prevent overturning during the early stages of construction;

Figures 2, 3:
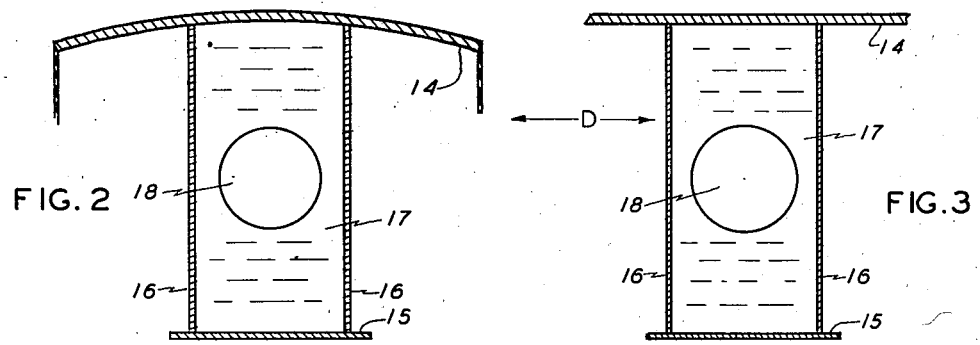
Fig. 2 illustrates in cross section a form of the ring-shaped element of girder ring D in which the periphery of the girder is curved in both directions, this form being used in building the truly spherical tanks outline in Fig. 7'.
Fig. 3 illustrates in cross section a form of the girder ring in which the periphery of the ring is straight in the direction parallel to the major axis of the tank, this form being used in building the substantially spherical and substantially cylindrical tanks outlined in Figs. 8 and 9.
Figure 11:
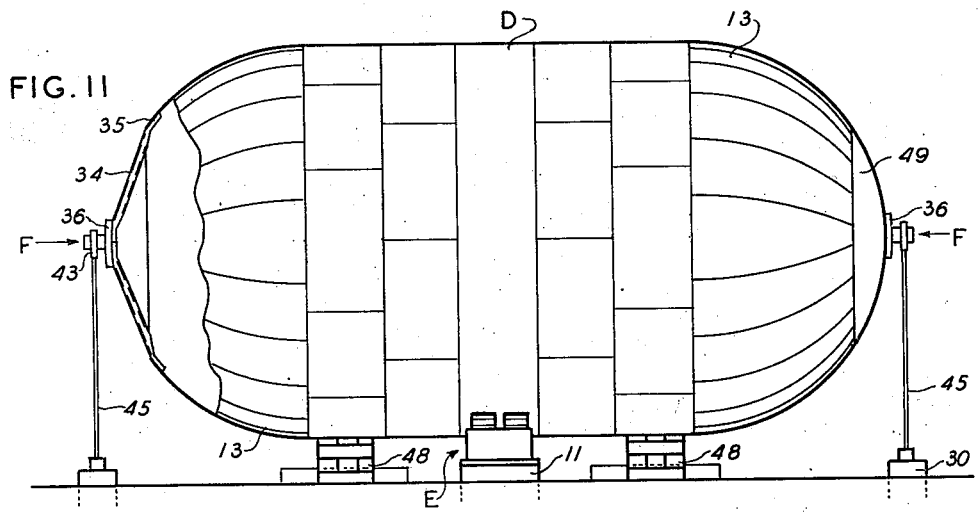
Figure 12:
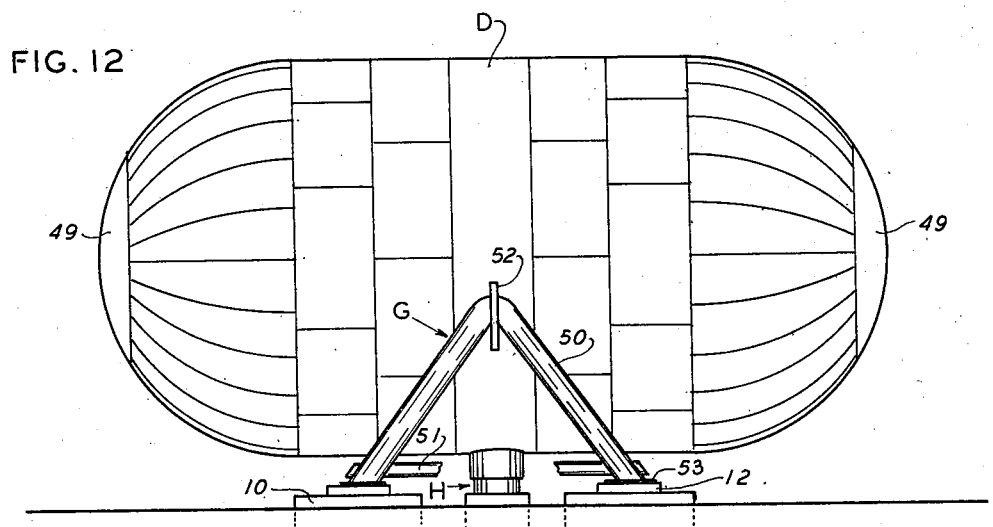
Figure 13:
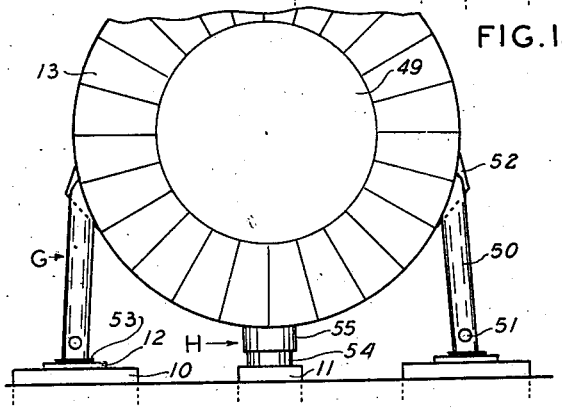
Figure 14:
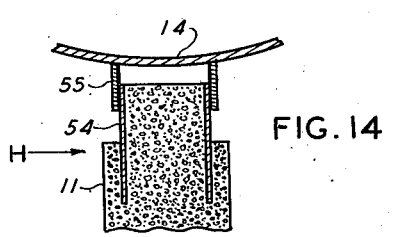
Figure 16:
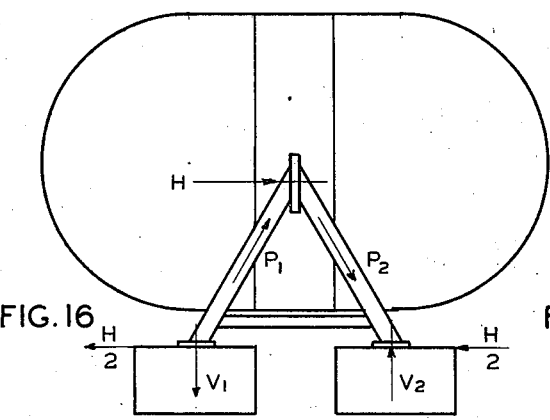
Figure 17:
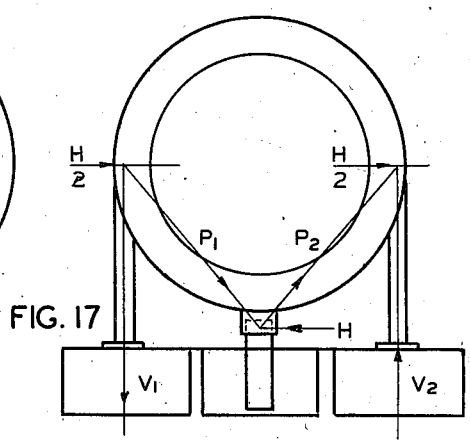
Figure 18:
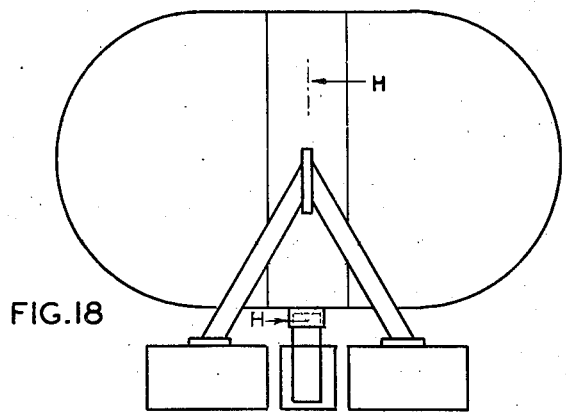
Figure 20:
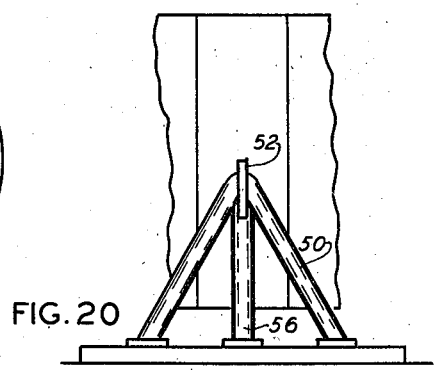
Figure 19:
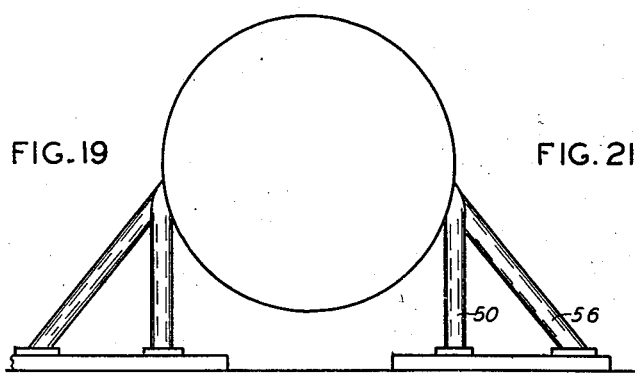

Fig. 7' illustrates the contour of a tank of truly spherical form, showing the use of the form of girder ring detailed in Fig. 2;

Fig. 8 illustrates the contour of a tank of substantially cylindrical form, using the straight form of girder ring detailed in Fig. 3;

Fig. 9 illustrates the contour of a tank of substantially cylindrical form, also using the straight form of girder ring;

Fig. 10 is an end elevation of a tank in an intermediate stage of construction;

Fig. 11 is a side elevation of the same, illustrating the method of guying to permit rotation of the shell for the purpose of downhand welding;

Fig. 12 is a side elevation of a tank in the completed form, showing the permanent supports;

Fig. 13 is an end elevation of the same;

Fig. 14 is a detail of the anchor pin indicated at H in Figs. 12 and 13;

Fig. 15 is a detail of one of the rotation pins indicated at F in Figs. 10 and 11;

Figs. 16, 17 and 18 are diagrams of the three major stresses (exclusive of dead weight) to which the supporting frames may be subjected;

Fig. 19 is an end elevation of a tank showing an alternative form of the supporting frames G;

Fig. 20 is a fragmentary side elevation of the same, and

Figure 21:
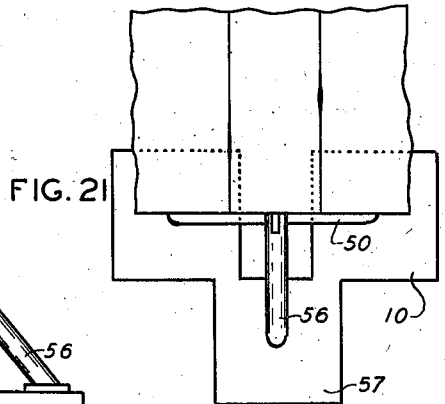

Fig. 21 is a fragmentary plan view of the same.

Figure 1:
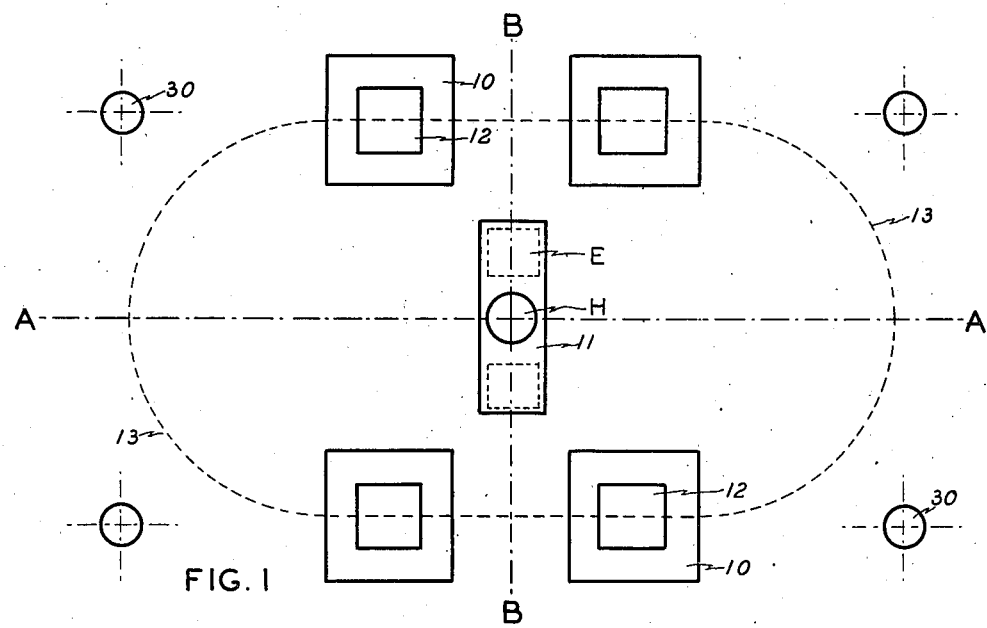
Fig. 1 is a plan view of a preferred arrangement of foundation blocks, indicating the contour of an exemplary finished tank by the dotted line 13—13, the major axis of the tank by the broken line A—A and the minor axis thereof by the broken line B—B.

Referring first to Fig. 1, the first step in the construction of the tank is to provide an adequate foundation. This may be a single concrete block, but preferably it will consist of the four bearing blocks 10—10 and the anchor block 11. The blocks 10 support the weight of the tank and its contents and unless the ground is exceptionally solid should be cast on top of suitable piling. These blocks are provided with metallic bearing plates 12—12, firmly bolted down to prevent shifting.

Anchor block 11 is called on to resist horizontally applied stresses only, but these may be of considerable moment and the block should either be deep or be cast over piling. The temporary blocks 30—30 carry relatively light stresses, and these during the construction period only. They may be shallow concrete blocks or short piles or even deadmen of heavy timber.

The positions of blocks 30 shown in Fig. 1 are illustrative only and will vary with the dimensions of the tank. In most cases one set of blocks will be used for the attachment of braces 29 and another set for the attachment of guys 45. As these blocks are removed after the tank is completed, their positioning will be governed solely by convenience during the construction period.

The next step is to provide the girder ring generally indicated at D, from which the shell 13 of the tank is later projected and to which the permanent supports are finally attached. This member is most clearly shown in side elevation in Fig. 7 and in cross section (through one side only) in Figs. 2 and 3.

While the construction of this member may be varied with the dimensions of the shell and the internal pressure which it is to sustain, it must in all cases be of great stiffness. A suitable type of girder may be built up of the outer and inner rings 14 and 15, the webs 16—16 and a plurality of spaced diaphragms 17, all of steel plate and the whole welded or riveted together to form a rigid unit. The diaphragms may have centrally spaced openings 18 and at least one such opening should be provided in one of the webs to afford access to the interior of the girder, if of sufficient size to permit workmen to enter.

As an illustration of detail of construction, in a girder ring 50 feet in diameter having the perimeter straight in one direction as in Fig. 3, the outer ring 14 may be of 1¼" plate and the inner ring 15 of ½", the webs 16 of ⅜" stock and the diaphragms of ¼". The distance between the webs may be about 24" and the radial distance from ring 15 to ring 14 about 48". A ring so constructed is exceedingly stiff in proportion to its weight and is only slightly deformed when the ring is rested on the rollers as hereinafter described.

In the construction of truly spherical tanks (as in Fig. 7') it is preferable to use the form of girder ring shown in Fig. 2, which is a central segment of a hollow sphere. Because of the spherical curvature of the outer member 14 in this form, much thinner plate may be used and the weight of the assembled ring may materially be reduced without any sacrifice of stiffness.

Figures 4, 5:
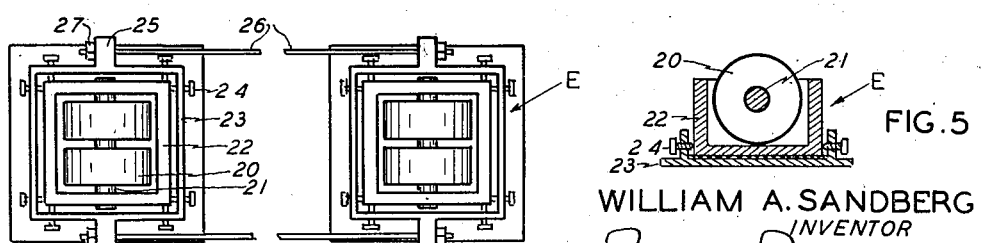
Fig. 4 is a plan view of a pair of the roller boxes E used in the construction of the tank.
Fig. 5 is a vertical section through one of the roller boxes.

On each end of anchor block 11 is mounted one of the roller boxes E shown in detail in Figs. 4 and 5. In these figures, 20 indicates one or more rollers supported on an idle shaft mounted in the opposite walls of a box 22, the lower face of which should be faced smooth. The rollers shown in these figures are cylindrical, such as would be suitable for a ring of the form of Fig. 3. If the spherical ring of Fig. 2 is to be supported, the faces of the rollers are to be correspondingly curved to provide an equal bearing throughout their length.

This bearing box rests on a layer of Babbitt or other antifriction metal in the bottom of a tray 23 which, in turn, rests on the smooth and level upper surface of the anchor block. The side walls of this tray are drilled and tapped to receive adjusting screws 24, by means of which the box may be shifted in the tray to produce exact alignment of the rollers with each other and with the axis of the tank. The trays are also provided with lugs 25 through which pass tie rods 26 having nuts 27, these rods being used to prevent the trays and rollers from being displaced laterally by the weight of the tank.

When the boxes E are in place and the rollers aligned, the girder ring D is lifted, as by a crane, and set on the rollers in an upright position as shown in Figs. 6 and 7. The ring is previously provided with oppositely disposed buttons 28 to which are attached the diagonal braces 29. The outer ends of these braces are attached to temporary blocks 30—30 which may desirably be held in spaced position by a rigid thrust member 31. In order to prevent longitudinal shifting of the lower perimeter of the ring on the rollers 20 it is desirable to weld ears 32 to the ring in such position as to engage the ends of the rollers.

The ring is now ready for the attachment of tank shell material, for the fabrication of the shell. This may be in the form of prefabricated rings or in the form of individual sheets, as may be preferred. The final form of the tank may be approximately spherical: i. e., two hemispherical heads may be attached directly to the ring as outlined in Fig. 8; or further cylindrical rings may be interposed as outlined in Fig. 9.

In either case the tank is fabricated by bolting the rings or sheets together with clips, up to and including the first radial section of the heads, but the head caps 49 are not placed in position. Up to this point the diagonal braces 29 remain in place and prevent the tank from being rotated on rollers 20.

The next step is to prepare the tank for rotation on the rollers to permit the seams to be welded downhand. To this end the rotation pins F are mounted in the open ends of the shell in the manner illustrated in Fig. 10 and at the left end of Fig. 11. The pin assembly consists of a plate 36 having a centrally disposed boss 37 (see Fig. 15) projected as a stud 38. This stud is formed in three diameters, producing shoulders 39 and 40, is threaded at its outer end and is provided with a locking nut 41 and a nonrotating washer 42. On that portion of the stud between the two shoulders is hung a plate 43 bored out to fit rather loosely on the stud and drilled at its lower corners as at 44 to receive wire guy lines 45. These lines are provided with turnbuckles and clevises 46 and are anchored at their outer ends in temporary blocks 30. At this stage the rotation pins are mounted in the tank ends by means of radial struts 34, which are attached at one end to the tank shell as at 35 in Figs. 10 and 11 and at the other to plate 36 as in Fig. 15. In thus mounting the pins, care is taken to have them in and exactly aligned with the longitudinal axis of the tank, which permits the shell (after removal of diagonal braces 29) to be rotated on rollers 20 without varying the strain on guy lines 45.

The diagonal braces may now be removed, the buttons 28 knocked off and any surplus metal ground off to smooth the outer surface of ring D. The shell is then welded up in any preferred manner, rotating the shell through small arcs at suitable intervals to permit the welding to be done downwardly, in which position the best and tightest welds can be made with the least labor.

When the welding of this portion of the shell is completed the head caps 49 are next to be placed. In preparation for this step the blocking 48 is placed below the center line of the tank, after which struts 34 are detached from the tank shell and from plate 36. The tank is actually balanced on the rollers and the blocking is a precaution only, in the event of a tendency to tilt due to earthquake shock or a high wind.

With the struts out of the way, the head caps may be positioned and bolted into place. Plates 36 are then attached centrally to the heads, the pins 38 as before being positioned exactly in the axis of the tank. The guy lines 45 are then replaced and the blocking 48 removed, after which the tank may again be rotated to bring the head seams into the most convenient position for the welding by which the shell is completed. Manholes not shown are provided for access to the interior of the shell after the head caps are in place. The attachment of plate 36 to one of the caps is shown at the right end of Fig. 11.

The next step is to provide the permanent support for the tank, this support consisting of the two A-frames indicated at G and the anchor pin indicated at H in Figs. 12 and 13.

Referring to these figures, each A-frame G consists of two thrust members 50, a tie member 51, an abutment plate 52 and two footplates 53. Members 50 may be of large diameter, heavy-walled pipe, member 51 of pipe of less diameter; or structural steel members may be used if preferred. The assembly is solidly welded or riveted into unitary form and the upper end of the frame is shaped to fit the curvature of the tank shell as at 52 in Fig. 13.

The anchor pin H is shown in elevation in the same figures and is detailed in section in Fig. 14. It consists of a steel ring 54 embedded in the concrete of anchor block 11 and preferably filled with concrete and a neatly telescoping ring 55 welded to the lower face of girder ring D. Rings 54 and 55 should be of relatively large diameter, for example, they may be about one-seventh the diameter of the tank shell. The lengths should be so adjusted that the ends clear slightly prior to setting the tank down to its final position on the foundations, in order to permit the placing and welding of ring 55 to the girder ring.

Prior to setting the tank in its final position it may be inflated to its full working pressure and rotated through a complete revolution for inspection of the seams. It may then be blown down to about half its working pressure after which the A-frames are welded to the girder ring and anchor pin ring 55 also positioned and welded. The roller boxes E are then backed away from each other until the footplates 53 of the A-frames rest on the bearing plates 12 and the outer anchor pin ring 55 telescopes with the inner ring 54. The footplates are then welded fast to the bearing plates to prevent shifting, and the guy lines 45 and roller boxes E are removed.

It is optional to weld the end of ring 55 to the wall of ring 54. The advantage in so doing is that moisture is thus excluded from the interior of the rings and internal corrosion retarded. The disadvantage is that a very slight distortion of the girder ring may be caused by changes in the height of the A-frames due to temperature fluctuation.

With the method of support here described, the dead load, i. e., the weight of the tank and its contents, is carried solely by the A-frames, it being understood that the strength of any weld between elements 54 and 55 is immaterial. This vertically applied force is effective in a plane coinciding with the minor axis of the tank and is transmitted to the A-frames through the substantially rigid girder ring. The tank is and must be symmetrical as regards this plane and no horizontally acting force is exercised by the dead load, the tendency of the legs of the A-frame to spread being neutralized by the tie member 51.

Horizontally acting stresses may, however, be applied by earthquake shock or by wind pressure and may act in any horizontal direction. These stresses are diagrammed in Figs. 16 to 18 inclusive.

In Fig. 16 the force is applied along the major axis of the tank and tends to overturn it endwise. This tendency is resisted solely by the A-frame, one leg of which is in tension (neglecting the factor of dead load) the other in compression, while the cross tie 51 is neutral.

In Fig. 17 the force is applied in a direction normal to the major axis, a direction in which the A-frames have no material rigidity. In this case the rigid girder ring D is equivalent to two thrust members $P_1$ and $P_2$ and thus transmits the force as a side thrust to anchor pin H in shear.

A third force which might be due either to earthquake or to a gusty wind tends to rock the tank endwise about the upper end of the A-frame as a pivot point. This force is transmitted to the anchor pin as a side thrust in a direction parallel to the major axis of the tank.

The above described method of supporting a tank of this character is advantageous in concentrating all forces tending to produce deformation of the shell within a narrow circumferential band, which may be brought to a high degree of rigidity and of resistance by the use of a relatively small quantity of reinforcing material.

This concentration of the deforming stresses due to weight, wind or earthquake within a narrowly limited area materially reduces the duty of the shell proper, the requirement for strength being substantially that required to resist internal pressure. This in turn permits the use of thinner shell material than would be permissible in the use of methods in which the supporting effect and resistances to wind or earthquake stresses are applied at two or more points along the length of the shell. Using the same factor of safety, a tank supported in the described manner should be constructed with less steel than would be required with any other method of support of which I am aware and with materially less labor.

A method of support which has some but not all of the advantages of that above described and thus is partially but not fully alternative is illustrated in Figs. 19 to 21 inclusive. In this modification the A-frame is provided with a third leg 56, seated on a third concrete block 57 and engaging the A-frame proper at a suitable angle, as for example 35° to 45°. The third leg acts as a strut to resist horizontal forces acting in a direction normal to the major axis, as diagrammed in Fig. 17, and takes the place of anchor pin H which may be omitted. This alternative does not provide any adequate resistance to the rocking force diagrammed in Fig. 18 and its use is not to be recommended in locations known to be subject to severe earthquake shocks.

I claim as my invention:

1. A horizontally disposed tank and support therefor, comprising: a vertically arranged, internally reinforced and substantially rigid girder ring; a pair of A-frames directly and rigidly attached to said ring at spaced points thereon and resting on earth-borne foundations; an anchor p'n attached to substantially the lowermost point of said girder ring and arranged to transmit horizontally applied stresses to an earth-borne anchor, and a multiplicity of plates of tank-shell material attached to and supported solely by said girder ring, said material being disposed to produce substantially identical enclosures of space at the two ends of said ring.

2. A horizontally disposed tank and support therefor, comprising: a vertically arranged, internally reinforced and substantially rigid girder ring; supporting means engaging said ring at spaced points thereon and arranged to transmit the weight of said tank to earth-borne foundations; an anchor pin arranged to transmit horizontally applied stresses to an earth-borne anchor, said anchor pin comprising telescoping members respectively seated in said anchor and attached to the lower side of said girder ring, and tank-shell material attached to and supported solely by said girder ring, said material being disposed to produce substantially identical enclosures of space at the two ends of said ring.

3. Means for resisting stresses applied horizontally to a tank resting on a support resilient in at least one direction, comprising: a first tubular member seated in an earth-borne anchor, and a second tubular member telescoping with said first tubular member, said second member attached to and downwardly projected from the lower side of said tank, the lengths of said members being so adjusted as to permit limited vertical movement of said tank without causing its weight to bear on said anchor block.

4. Means for resisting stresses applied horizontally to a tank resting on a support resilient in at least one direction, comprising: an earth-borne anchor block; a rigid upward projection from said block, and a hollow member attached to the lower side of said tank and telescoping with said upward projection, the lengths of said members being so adjusted as to permit limited vertical movement of said tank without causing its weight to bear on said anchor black.

5. A horizontally disposed, substantially cylindrical tank, comprising: a circumferential band of heavy steel plate forming part of the shell of said tank; a plurality of spaced rib members attached to and inwardly projected from said band, and a reinforcing ring joining the inner edges of said ribs to form with said ribs and said band a rigid, trunk-like, hollow girder ring; a pair of oppositely disposed supporting members attached to the periphery of said ring and arranged to support said ring in a position in which its axis is horizontal, and plates of tank shell material projected from the ends of said band, concentrically with said horizontal axis, to form substantially equal enclosures of space at the ends of said ring, the entire weight of said tank and of its momentary contents being transmitted through said ring to said supporting members.

WILLIAM A. SANDBERG.